US007788277B2

(12) United States Patent
Silagi et al.

(10) Patent No.: US 7,788,277 B2
(45) Date of Patent: Aug. 31, 2010

(54) METHODS AND APPARATUS FOR RAPID CAPTURE OF PROGRAM IDENTIFIER DATA IN A BROADBAND TRANSCODER MULTIPLEXER

(75) Inventors: Randall Lewis Silagi, San Diego, CA (US); Yuan-Yuan Young, San Diego, CA (US); Guofei Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 311 days.

(21) Appl. No.: 10/626,824

(22) Filed: Jul. 23, 2003

(65) Prior Publication Data

US 2004/0122864 A1  Jun. 24, 2004

Related U.S. Application Data

(60) Provisional application No. 60/398,416, filed on Jul. 24, 2002.

(51) Int. Cl.
*G06F 7/00* (2006.01)
(52) U.S. Cl. ...................................... 707/769
(58) Field of Classification Search ............... 370/473, 370/412; 375/240.29, 316, 240; 709/220; 725/47, 58; 386/68; 365/222; 707/769, 707/705
See application file for complete search history.

(56) References Cited

U.S. PATENT DOCUMENTS

| | | | | |
|---|---|---|---|---|
| 5,666,293 A * | 9/1997 | Metz et al. ............... 709/220 |
| 5,666,645 A * | 9/1997 | Thomas et al. ............... 725/47 |
| 6,157,673 A * | 12/2000 | Cuccia ..................... 375/240 |
| 6,181,706 B1 * | 1/2001 | Anderson et al. ........... 370/412 |
| 6,275,505 B1 * | 8/2001 | O'Loughlin et al. ........ 370/473 |
| 6,286,037 B1 * | 9/2001 | Matsuura ................... 709/220 |
| 6,442,329 B1 * | 8/2002 | Gough ........................ 386/68 |
| 6,747,906 B2 * | 6/2004 | Matsuzaki ................. 365/222 |
| 6,757,906 B1 * | 6/2004 | Look et al. ................... 725/45 |
| 7,088,732 B2 * | 8/2006 | Min ........................... 370/428 |
| 2002/0116713 A1 * | 8/2002 | Mukai et al. .................. 725/58 |
| 2003/0048854 A1 * | 3/2003 | Kaku ..................... 375/240.29 |
| 2003/0118127 A1 * | 6/2003 | Peting ....................... 375/316 |

FOREIGN PATENT DOCUMENTS

| EP | 0 905 983 | * | 3/1999 |
| EP | 0 921 681 | * | 6/1999 |
| GB | 99/57905 | | 11/1999 |

OTHER PUBLICATIONS

"Special Edition Using Microsoft Access 2000," May 5, 1999, published by Que, Safari Books Online Version (http://proquest.safaribooksonline.com/0789716062/ch061ev1sec9).*

* cited by examiner

*Primary Examiner*—Tony Mahmoudi
*Assistant Examiner*—Paul Kim
(74) *Attorney, Agent, or Firm*—Larry T. Cullen

(57) ABSTRACT

Apparatus and methods are provided for efficient collection and identification of program information contained in a plurality of multimedia transport streams. Requests for program information are matched against incoming program information as they are received from the incoming multimedia transport streams. The processing of the requests and the collection of program information are done asynchronously and simultaneously. This enables processing of program information from forty or more MPEG transport streams in such a way that their collection rate is reduced from several minutes to less than one second.

24 Claims, 8 Drawing Sheets

METHODS AND APPARATUS FOR RAPID CAPTURE OF PROGRAM IDENTIFIER DATA IN A BROADBAND TRANSCODER MULTIPLEXER

This application claims the benefit of U.S. Provisional Application No. 60/398,416 filed Jul. 24, 2002.

FIELD OF THE INVENTION

The present invention relates to the field of digital multimedia. More specifically, the present invention relates to the collection of digital multimedia program information from a plurality of MPEG transport streams.

BACKGROUND OF THE INVENTION

In a broadband multimedia distribution network, a transcoder/multiplexer (TMX) is often used to perform a number of different operations on the multimedia streams. Some of these operations include basic multiplexing of the incoming MPEG-2 transport packets, adding or dropping streams that appear in the output stream, video bit rate transcoding, statistical multiplexing, MPEG-2 video splicing, multimedia program insertion, IP data encapsulation and many others. In order to perform these tasks, each multimedia program must be readily identified and distinguished from other programs in the transport streams.

A multimedia program may contain a variety of audio, video, animation, text, data, and other information. An MPEG-2 multimedia program, for example, may contain three elementary streams a video, an audio and a data stream. In some instances, such a multimedia program may contain several additional audio or data streams, as well. In order to transmit or store such programs, the elementary streams are multiplexed to form the transport stream. The transport stream structure is based upon packets of constant size (i.e., 188 bytes in MPEG-2 transport, stream); each transport stream packet is comprised of a header and a payload. Although it is possible for a transport stream to contain only a single program stream, it is often required to transmit several multimedia programs simultaneously in a transport stream. In such cases, numerous audio, video, data and other elementary streams are combined together, in a multiplexed fashion, to form the composite transport stream.

In order to facilitate identification and extraction of elementary streams, various program identification fields and mapping tables are dispersed throughout the transport stream. The information contained in these tables may be utilized to uniquely identify a specific multimedia program and/or elementary stream carried within a single or plurality of multiplexed transport streams. In a broadband multimedia distribution network, a receiver (e.g., a TMX) should be able to readily identify and extract any program stream and its constituent elementary streams from the plurality of transport streams at its disposal. In prior art systems, the program information (e.g., information contained in MPEG Section Tables) is collected sequentially. Sequential collection of such program information from a large number of MPEG transport streams could take several minutes. This is an unreasonable amount of time and would make a TMX receiving such a large number of transport streams practically unusable.

It would be advantageous to provide a method and apparatus for collecting the program information from a plurality of transport streams simultaneously and efficiently. It would also be advantageous to enable collection of the program information asynchronously and in parallel with the processing of the program information.

The methods and apparatus of the present invention provide the foregoing and other advantages.

SUMMARY OF THE INVENTION

The present invention relates to the collection of program information from a plurality of multimedia transport streams, such as MPEG transport streams. The program information may be in the form of Section Tables carried in the MPEG transport streams.

It is an object of the present invention to provide an apparatus and method for improving the collection rate of all program information contained in one or more multimedia transport streams.

The present invention enables collection of program information asynchronously and in parallel with the processing of the information. In other words, the present invention enables the collection of program information on one port, such as port 2, while program information is being processed on a different port, such as port 1.

A further advantage of the present invention is that the program information may be collected as it appears in the transport stream. This aspect of the present invention does not affect the MPEG standard sequence of Section Table dependence. For example, the MPEG standard requires that the Program Association Table (PAT) be collected before the Program Map Table (PMT), and the present invention does not change or affect that requirement. However, rather than collecting the PMT's in order of ascending Packet Identification (PID) Codes, the present invention will collect the PMT PID's in the order they appear in the transport stream.

Another feature of the present invention is the ability to organize, monitor, and match each request for the program information based on a plurality of identification information such as, but not limited to, the PID, Table ID, Table ID Extension, Version Number, Current/Next Indicator and Section Number. At any particular moment, there could be, e.g., anywhere from zero to 1000 or more outstanding requests to collect program information. These requests, which may be initiated by different applications, are collected and matched against the program information as they are received from the transport stream.

In accordance with a further aspect of the present invention, the matching of collected and requested program identification information may be accomplished by sequentially searching the requested program information. Alternatively, more sophisticated search algorithms, such as binary search algorithms, binary tree algorithms, or other type of search algorithms may be used to perform this task.

In accordance with the features of the present invention, all further inquiries regarding the status of requested program information may be blocked until all requested program information is entirely collected and successfully matched against the received program information from the transport streams. Alternatively the application that has initiated the request may periodically poll the status of that request, or a group of requests, in order to assess the availability of program information.

The present invention may also be used to collect Digital Queue Tone messages for advertisement insertion and/or for digital program splicing in the multimedia transport stream.

Further, the present invention may be used to provide for the collection of Internet Data contained in the MPEG transport stream.

Those skilled in the art will appreciate that the methods and apparatus of the present invention may also be used to collect other types of data from a plurality of transport streams. These and other objects, features and advantages of the present invention will become apparent to those skilled in the art upon reading of the following detailed description in conjunction with the accompanying drawings.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention. It should be understood that various changes may be made in the function and arrangement of elements without departing from the spirit and scope of the invention as set forth in the appended claims.

A multimedia transport stream, such as an MPEG transport stream, is often comprised of several program streams that are multiplexed to form a composite stream. Each multimedia program stream, in turn, may further contain several Elementary Streams ("ES"). These elementary streams may include audio, video, data and other types of information. In some instances it is possible for a multimedia program (e.g., a video program) to contain a plurality of sound tracks and/or other data streams such as subtitles and closed caption channels. Thus, a composite transport stream may be considered as a conglomeration of various elementary streams that are multiplexed and transported simultaneously.

An elementary stream is essentially an endless string of bits representing images, video, sound, etc. In order to facilitate the transmission, delivery and storage of such multimedia content, each elementary stream is broken up into discrete blocks or packets to form what is known as the Packetized Elementary Stream (PES). Each PES packet is comprised of a data section, containing the digitized multimedia data (e.g., compressed video, audio, text, etc.) as well as other fields that are used for synchronization, temporal alignment, stream identification and other purposes. These additional fields collectively comprise the header portion of a PES packet. The information contained in the PES header fields is subsequently used at the receiver to identify and extract the appropriate packets from the transport stream.

The composite transport stream is generally made up of many elementary streams from different programs. For example, an MPEG-2 transport stream used in a digital satellite TV broadcast system is generally comprised of several TV programs plus a variety of audio and text streams per TV program. The transport stream is structurally arranged as blocks of information with a constant size. In the case of an MPEG-2 transport stream, these packets are 188 bytes long. The transport stream packets should not be confused with previously described PES packets, which are normally larger and may vary in size.

Figure 1:
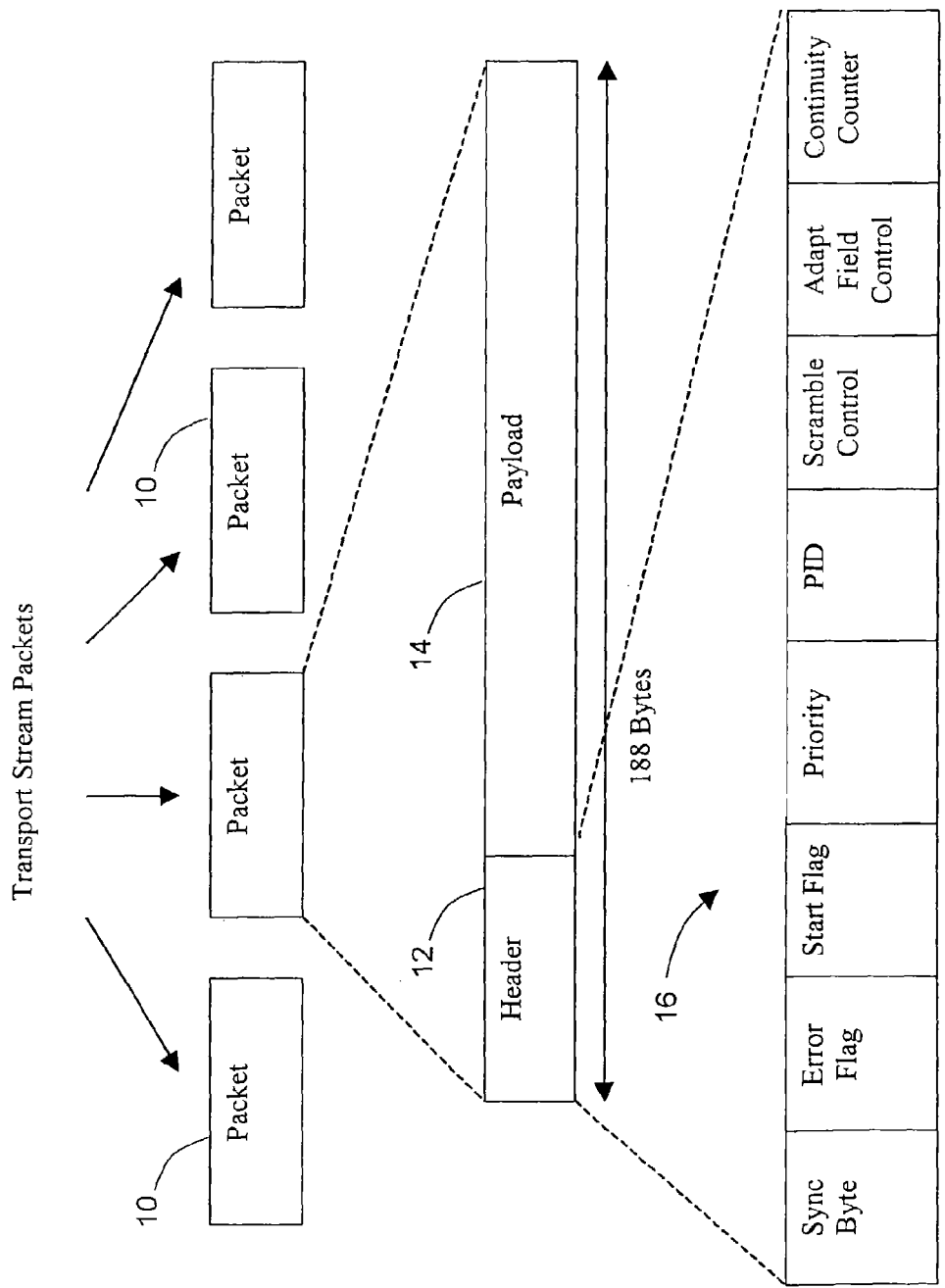
FIG. 1 shows an exemplary arrangement of MPEG-2 transport stream packets.

FIG. 1 illustrates the arrangement of MPEG-2 transport stream packets 10, as is well known in the prior art. FIG. 1 indicates that each 188-byte packet is comprised of a header 12 and a payload area 14. The header is further comprised of several other fields 16 that are used for identification, synchronization and other purposes. For example, the header begins with a unique synchronization field (sync-byte) that is used to identify the start of each packet. The header also contains a Packet Identification (PID) Code that uniquely identifies each elementary stream. A receiver interested in accessing an elementary stream can simply monitor the packets of an incoming transport stream and select only those packets with a desired PID value.

In a multiplexed transport stream, the presence of PID values alone may not be sufficient to uniquely identify all the components of a multimedia program. For example, a demultiplexer must not only know the PID values of specific elementary streams, but it also needs to know which audio stream is associated with which video stream. In order to overcome this ambiguity, additional Program Specific Information (PSI) is often included in the transport stream to clarify the association of different elementary streams with each other.

Figure 2:
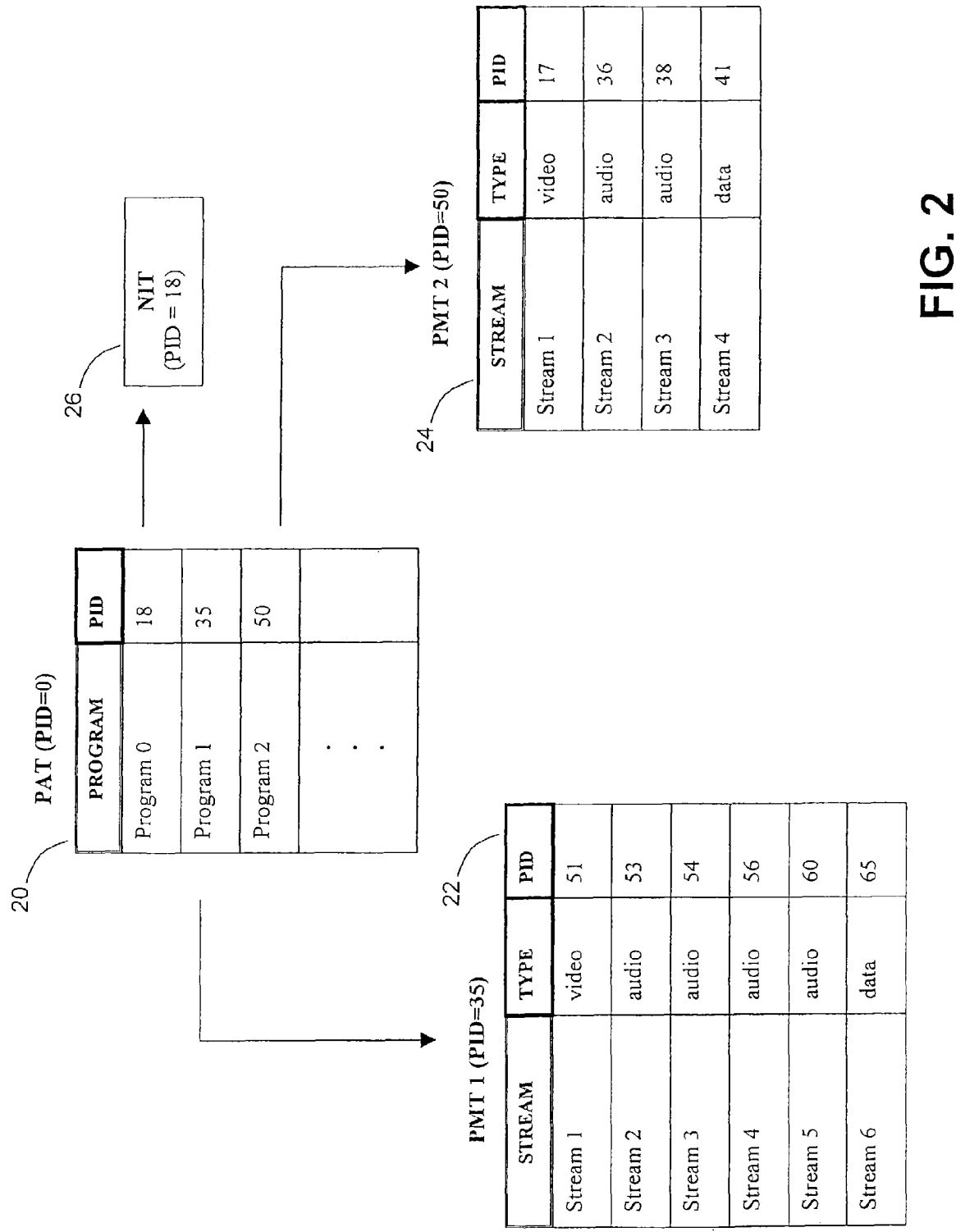
FIG. 2 shows an exemplary arrangement of MPEG-2 Program Specific information (PSI)

FIG. 2 illustrates an example of PSI fields and their usage in an MPEG-2 transport stream, as is known in the prior art. The demultiplexer, at start up, has no prior knowledge of composition of the transport stream. It must initially look for packets with PID of zero. This PID is reserved for the Program Association Table (PAT). The PAT contains a listing of all programs in the transport stream as well as the PID values for Program Map Tables (PMT) associated with each multimedia program. For example, the PAT 20 of FIG. 2 includes three programs and three PID values corresponding to the PMT's of each program. The PMT 22 for program 1 (i.e., PMT with PID=35) further contains the PID values for one video, four audio and one data streams, all associated with program 1. Similarly, the PMT 24 for program 2 (i.e., PMT with PID=50) contains the PID values for one video, two audio and one data streams. Program 0 and its corresponding PID (i.e., PID=18) identify the Network Identification Table (NIT) 26. The NIT contains information about other available transport streams. For example, in a satellite broadcast network, NIT 26 would contain information regarding orbital position, the polarization, carrier frequency and other information relating to the satellite.

The presence of PSI, such as shown in the exemplary PSI tables of FIG. 2, makes it possible to uniquely identify and decode any multimedia program, and its associated elementary streams in the presence of multiple programs and/or transport streams. Nevertheless, the task of searching a large number of transport streams with an even larger number of elementary streams can be very time consuming. This task may be further complicated if simultaneous requests for program information are waiting to be completed. It is an object of the present invention to provide more efficient methods and apparatus for collecting, organizing and matching such program information as the incoming packets from various transport streams are monitored. Using the methods and apparatus of the present invention, the collection of Section Tables from forty or more MPEG transport streams can be reduced from a few minutes to less than one second.

The present invention is able to organize, monitor, and match each request for program information based on parameters such as PID, Table ID, Table ID. Extension, Version Number, Current/Next Indicator, and Section Number, etc. The requests are matched and collected as the program information is received from the transport stream.

Figure 3:
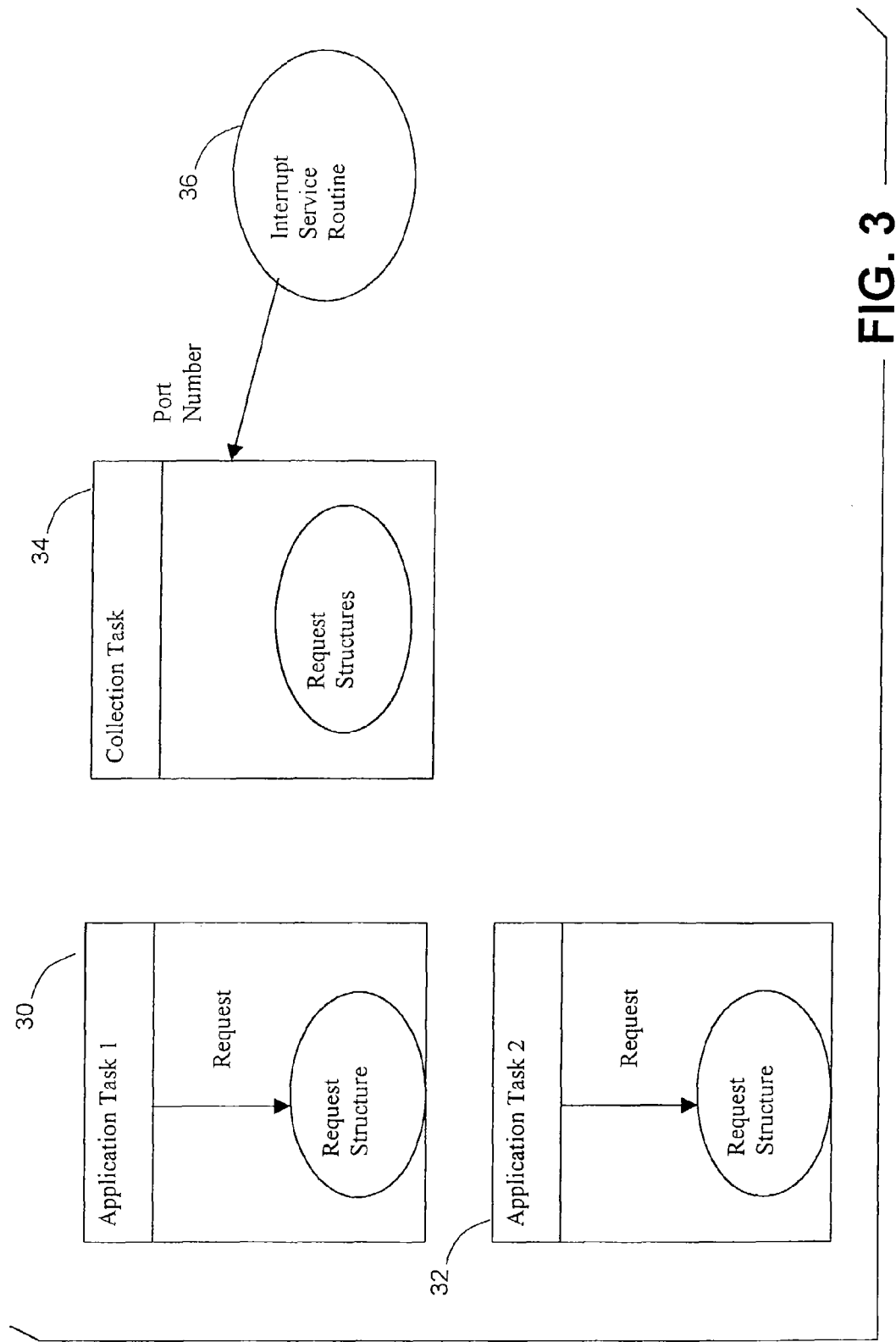
FIG. 3 shows a task model for an example embodiment of the invention.

Referring to FIG. 3, there is shown a high-level block diagram of a Task Model for an exemplary embodiment of the present invention. When a request for program information is initiated by an application, a structure containing all the relevant program information is generated. This request is made in the context of the Application's Task. The request structure contains all the information required to enable collection of the program information. By way of example, and not by way of limitation, some of the information that comprises the request structure includes the Port number, PID, PID Alias, Table ID, Table ID Extension, Current/Next Indicator, Section Number, and the like. The request structure also acts as an interface between the Application Tasks 30, 32 and the Collection Task 34, as depicted in FIG. 3.

When the request for program information is enabled, this structure is moved to a linked list of active requests, i.e., the Active List (a linked list, as is well known in the prior art, is a special type of list that can be dynamically changed in size, dynamic structures can be changed in size and are unique in that they allow the insertion or deletion of any element in the list quickly and efficiently). There is an Active List associated with each port that accepts incoming transport stream packets. When an MPEG transport packet is received, an Interrupt Service Routine 36 determines which port the MPEG packet came from and passes this information to the Collection Task 34. The Collection Task then uses the port number and performs a search of the associated Active List. The search commences with matching of the received PID against the PID values on the Active List. If a match is found, the request is moved to the Process Request linked list. The mere matching of the PID, however, is not sufficient since there may exist multiple requests with the same PID, but different Section Table ID's, for example, contained in the request. Once the request is moved to the Process Request list, the remaining items of the request, such as the Table ID, Table ID Extension, Version Number and Section Number, and others are compared against the corresponding information received from the transport packets. If a complete match between the received program information and items on the Process Request list is found, the request is moved to the Completed List and the requesting application is notified. If at any stage of the search, a mismatch is encountered, the request is moved back to the Active List, awaiting the next batch of received program information.

It is instructive to note that MPEG Section Tables may be contained in a single MPEG transport packet or may be split across several packets. An MPEG packet may contain a single Section Table or several. Thus, it may become necessary to conduct the search and compare procedures for several incoming packets multiple times for a single packet. It can be appreciated that many different search algorithms may be used to conduct the above described matching procedure between the incoming transport packet information and the contents of the Process Request lists. The simplest way is to sequentially examine each item on the Process Request list in search of a match. This is also known as the linear search algorithm and while conceptually simple, this method can be computationally inefficient. Consequently other algorithms may be used to improve the search efficiency. For example, a binary search algorithm may be used where the original list is repeatedly divided in two halves and each half is searched until a match is obtained. Other well-known search methods such as Binary Tree Algorithms may be used, as well.

It can also be appreciated that using the features of the present invention, the collection and processing of the program information are effectively decoupled. This allows asynchronous collection and processing of the program information. For example, while the collection is taking place on port 1, the processing of the program information can take place on port 2. From the Application Task's point of view all requests for program information are filled in parallel. Once a complete match for a program request is fulfilled, the application may be notified so that decoding and/or further processing of the requested program(s) can take place. Using this methodology, the application can request to be pended until the requested program information is collected. Alternatively, the application may periodically poll the status of each request, or a group of requests, to assess the availability of program information. Accordingly, the Application Task can execute a Status Query, which returns the number of requests that are completed.

Figure 4:
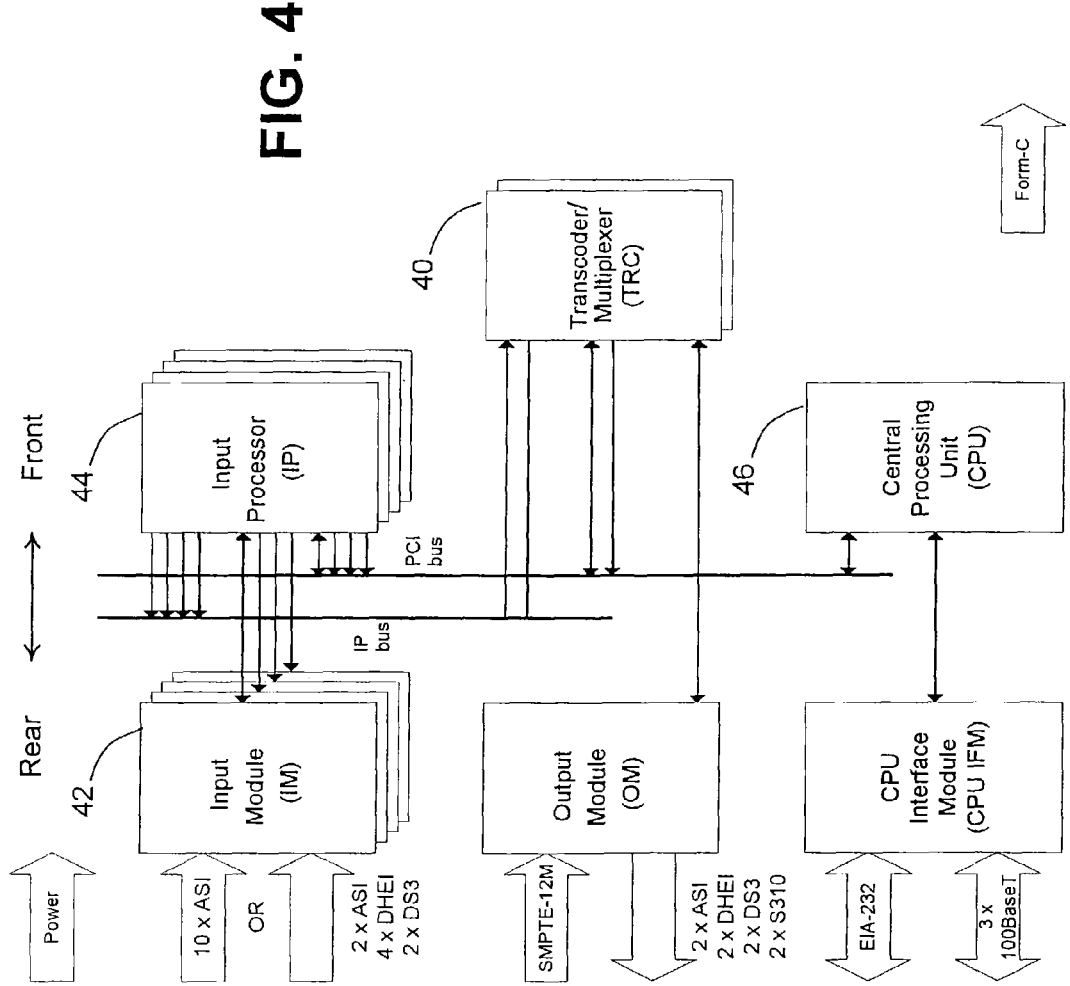
FIG. 4 is a block diagram of a transcoder/multiplexer (TMX) which can be implemented in accordance with the present invention.

Referring to FIG. 4, there is shown a block diagram of a Transcoder/Multiplexer (TMX), which implements an example embodiment of the present invention. The Input Module (IM) 42 captures the transport stream signals that contain the MPEG video, audio, and Program Information tables. Each of these transport streams may contain a large number, for example anywhere from two to fifty different section tables. These may include a variety of tables, such as, but not limited to PAT's, PMT's, Program and System Information Protocol (PSIP) Tables, Event Information Tables (EIT's), etc. The Input Processor (IP) 44 captures and routes the PID's to the Transcoder/Multiplexer Card (TRC) 40 if the PID is video/audio, or to the Central Processing Unit (CPU) 46 if the PID contains a Program Information Table. The different section tables are identified and processed by the CPU, as described above, in order to determine whether or not a match between the requested and received program information is obtained.

Figure 5:
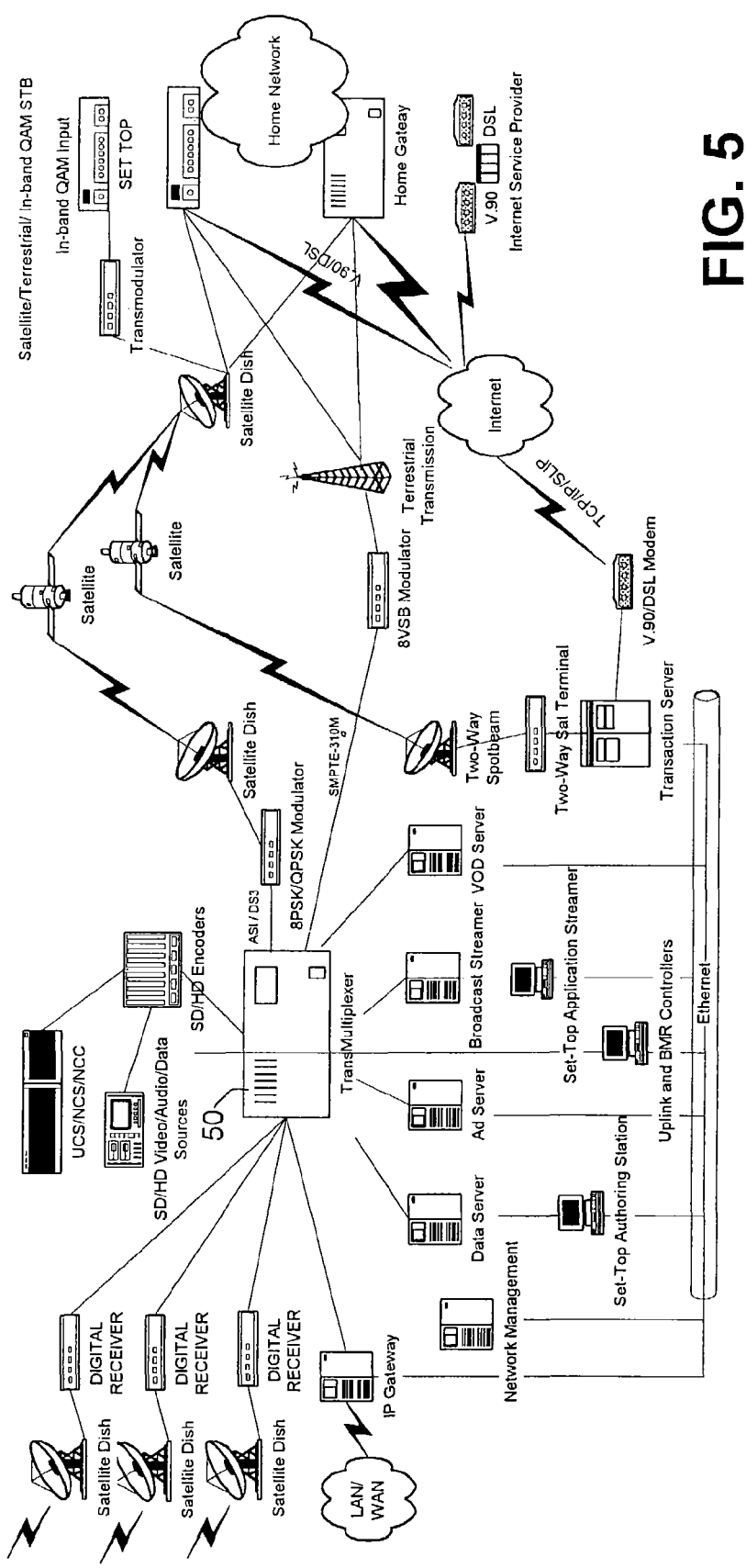
FIG. 5 is a system level diagram of an example multimedia network in accordance with the invention.
Figure 6:
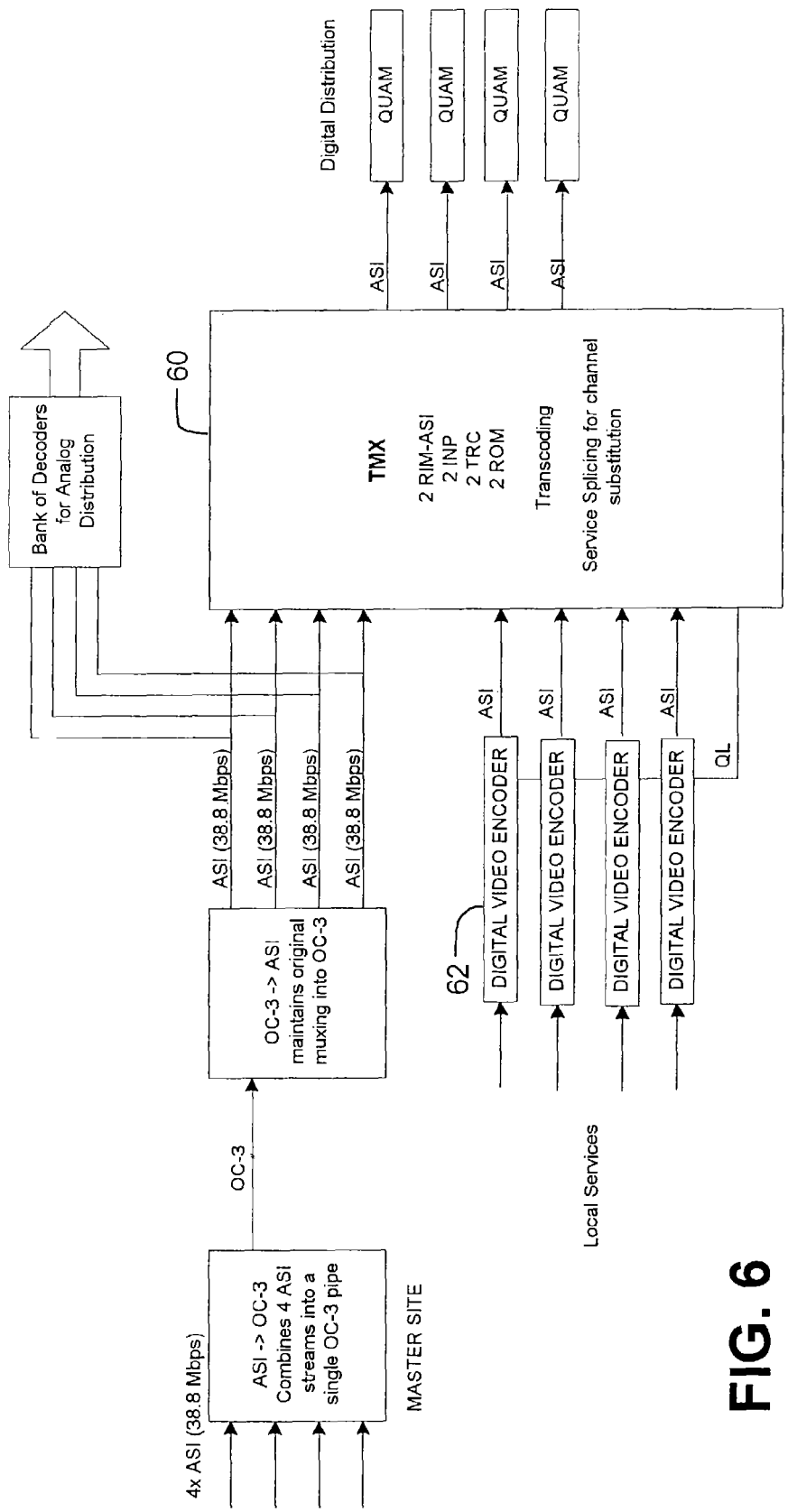
FIG. 6 is a block diagram of a network hub site having a TMX that can be implemented in accordance with the present invention.
Figure 7:
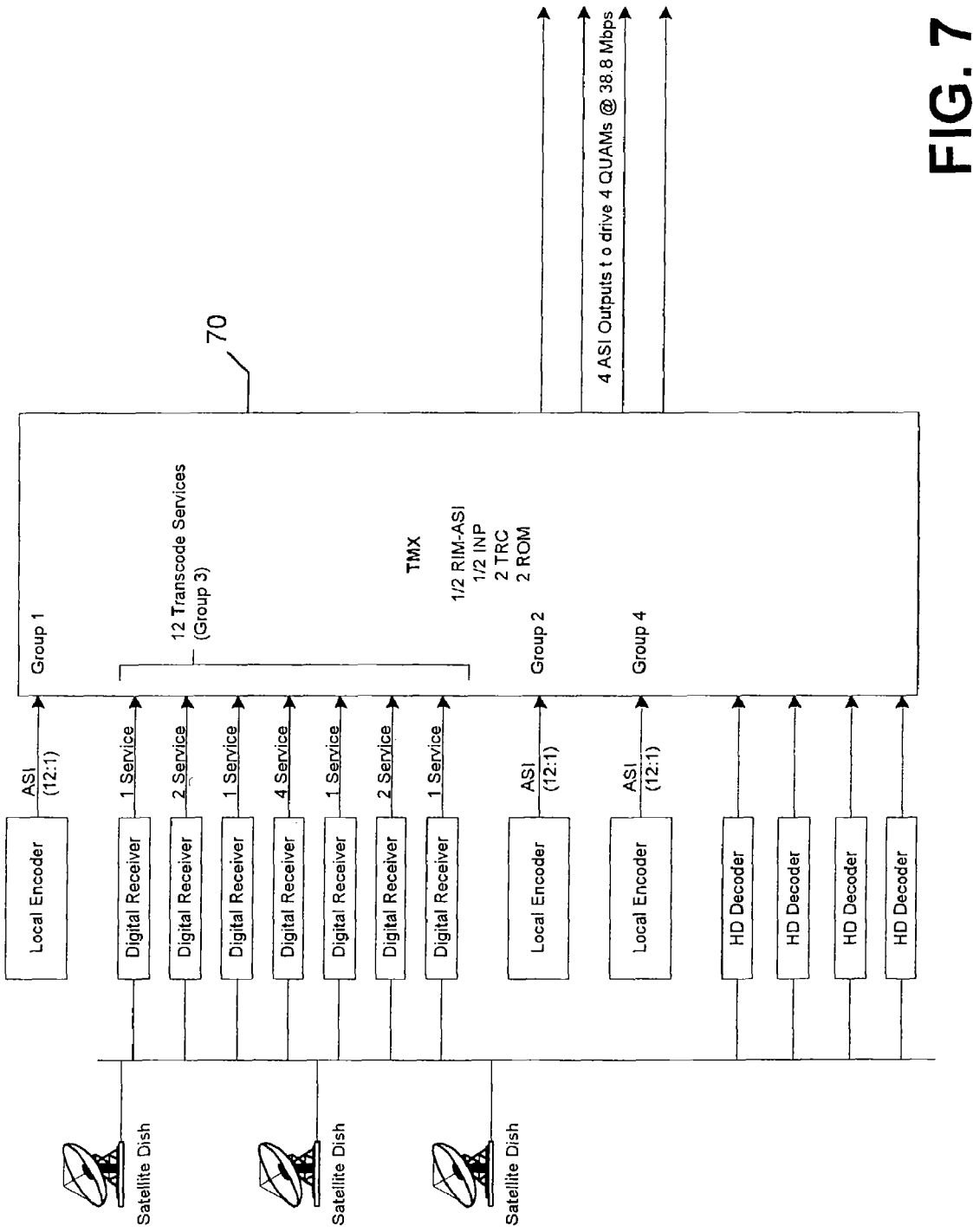
FIG. 7 is a block diagram of an example headend implementation in accordance with the invention.

FIGS. 5 to 7 are block diagrams showing possible systems where example embodiments of the present invention may be utilized. In FIG. 5, the TMX 50 which implements the present invention is used in a broadband environment with a variety of multimedia streams including satellite, Internet and terrestrial distribution and transmission networks. In FIG. 6, a TMX 60 is employed with multiple Asynchronous Serial Interface (ASI) inputs for multimedia streams; some of the input streams may have been originated remotely (e.g., carried over OC3) while others may have been locally produced as analog streams and fed into single channel video encoders 62 to produce compressed MPEG-2 streams. The TMX output is a multiplexed ASI output of multimedia streams suitable for digital distribution. In FIG. 7, the TMX 70 is utilized with multiple satellite dish networks as well as local encoders. This is an example of the TMX being used in a statistical multiplex, mode with the present invention. In the implementation illustrated, there are four statistical multiplex groups each with twelve MPEG services. In this implementation, the present invention may be utilized to collect the PSI for forty-eight MPEG services simultaneously. It should be appreciated that implementations using a different number of statistical multiplex groups and/or a different number of services can be provided instead.

Figure 8:
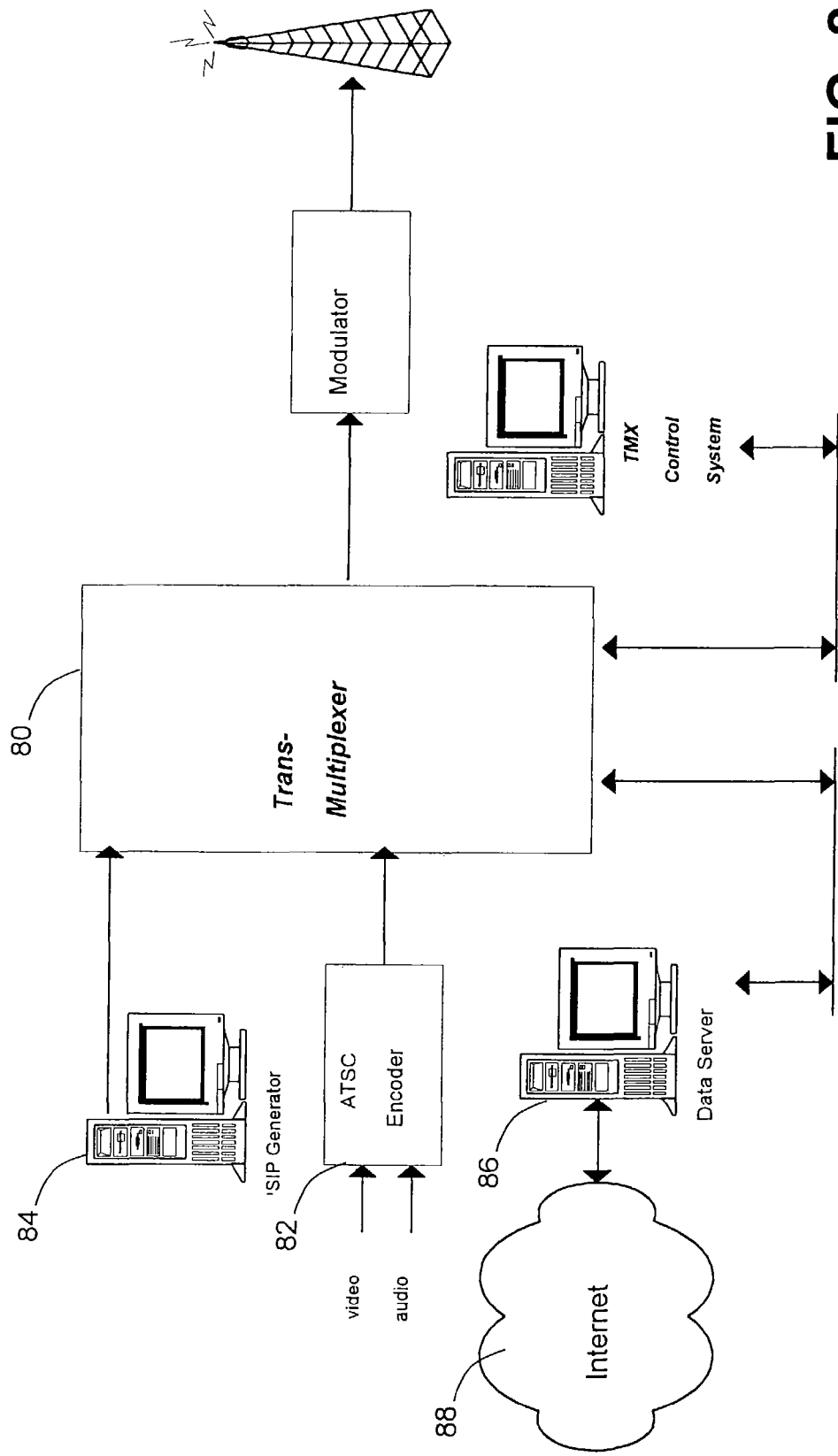
FIG. 8 is a block diagram of example transmission side components in accordance with the invention.

FIG. 8 depicts an ATSC broadcast example in accordance with the invention in which a TMX 80 is used to multiplex data from several sources including an ATSC program encoder 82, network information (i.e., PSIP) generator 84, and local (e.g., disk-based) 86 and remote (e.g., Internet) 88 data server traffic. It is understood that the features of the present invention can be used in any environment that requires quick integration and processing of multimedia services such as networks with MPEG transport distribution architecture. The services and operations may include but are not limited to, basic packet multiplexing, statistical multiplexing, IP data encapsulation, video splicing, advertisement insertion, bit rate transcoding and generation of customized transport streams. All of the above services and, operations require identification and extraction of program, information from packetized MPEG transport streams and thus can benefit from the embodiments of the present invention. When collecting Section Tables from such a large number of transport streams, the present invention improves the collection rate from several minutes to less than one second.

It should now be appreciated that the present invention provides advantageous methods and apparatus for collecting program information from a plurality of transport streams simultaneously. Although the invention has been described in connection with various illustrated embodiments, numerous modifications and adaptations may be made thereto without departing from the spirit and scope of the invention as set forth in the claims.

What is claimed is:

1. A method for collecting multimedia program information from a plurality of transport streams received at a transcoder/multiplexer, the method comprising:

receiving a plurality of transport streams, each of which contains program information regarding multimedia programs carried in the transport stream, receiving a request for collecting program information, said request identifying program information to be collected from one or more of the transport streams and said request including a first list of requested program information and a second list of requested program information, wherein the first list of program information includes at least one Program Identification (PID) Code and the second list of program information includes one of Table ID, Table ID Extension, Version Number or Section Number, obtaining program information packets from the plurality of transport streams as they are received, the obtained program information packets containing first received program information and second received program information;

matching the first received program information with the first list of requested program information; and if the first received program information matches information in the first list of requested program information, matching the second received program information with the second list of requested program information, wherein the first received program information includes a port and a Program Identification (PID) Code and the second received program information includes one of Table ID, Table ID Extension, Version Number or Section Number, and the method comprises:

storing the port and the PID in an active list associated with the port, the active list including requests for collecting program information for transport streams received on the port;

moving the request to a processing list if the first received program information matches the PID in the active list for the port, wherein the processing list includes multiple requests that have matched PIDs but do not have matches with second lists of requested program information for the requests;

moving the request to a completed list if the one of the Table ID, the Table ID Extension, the Version Number or the Section Number in the second list of requested program information matches the second received program information; and notifying an application making the request that a complete match is found.

2. The method of claim 1 wherein at least one of the transport streams is an IVIPEG transport stream.

3. The method of claim 1 wherein the requested program information is comprised of multiple fields.

4. The method of claim 3 wherein said fields include at least one Program Identification (PID) Code.

5. The method of claim 1 wherein the steps of matching the first received program information and matching the second received program information is done asynchronously with respect to said receiving step.

6. The method of claim 1 further comprising the step of notifying an application requesting the program information once a match is located for the first received program information and the second received program information.

7. The method of claim 6 wherein the application requesting the program information periodically queries the status of the request.

8. The method of claim 1 wherein the program information carried in the transport streams is received out of the sequence specified in the request.

9. The method of claim 1 wherein said processing includes dividing the requested information into multiple lists and searching each list as program information is received from the transport streams.

10. The method of claim 9 wherein a linear search algorithm is used to conduct the search.

11. The method of claim 9 wherein a binary search algorithm is used to conduct the search.

12. The method of claim 1 wherein plurality of requests is received simultaneously from different applications.

13. Apparatus for collecting multimedia program information from a plurality of transport streams, comprising:

an input module for receiving a plurality of transport streams, each of which contains at least one of video, audio, and program information regarding multimedia programs carried in the transport stream, an input processor for separating program information packets from the plurality of transport streams as they are received, the separated program information packets containing first received program information and second received program information and a central processing unit for: (i) receiving a request for specific program information separated by said input processor, and the request includes a first list of requested program information and a second list of requested program information, wherein the first list of program information includes at least one Program Identification (PID) Code and the second list of program information includes one of Table ID, Table ID Extension, Version Number or Section Number (ii) matching the first received program information with the first list of requested program information; and (iii) if the first received program information matches information in the first list of requested program information, matching second received program information with the second list of requested program information, wherein the first received program information includes a port and a Program Identification (PID) Code and the second received program information includes one of Table ID, Table ID Extension, Version Number or Section Number, and the central processing unit stores the port and the PID in an active list associated with the port, the active list including requests for collecting program information for transport streams received on the port;

moves the request to a processing list if the first received program information matches the PID in the active list for the port, wherein the processing list includes multiple requests that have matched PIDs but do not have matches with second lists of requested program information for the requests;

moves the request to a completed list if the one of the Table ID, the Table ID Extension, the Version Number or the Section Number in the second list of requested program information matches the second received program information; and notifies an application making the request that a complete match is found.

14. Apparatus in accordance with claim 13 wherein at least one of the transport streams is an IVIPEG transport stream.

15. Apparatus in accordance with claim 13 wherein the requested program information is comprised of multiple fields.

16. Apparatus in accordance with claim 15 wherein, said fields include at least one Program Identification (PD) Code.

17. Apparatus in accordance with claim 13 wherein matching the first received program information and matching the second received program information is done asynchronously with respect to receiving requests for collecting program information.

18. Apparatus, in accordance with claim 13 further capable of notifying an application requesting the program information once a match is located for the first received program information and the second received program information.

19. Apparatus in accordance with claim 18 wherein the application requesting the program information periodically queries the status of the request.

20. Apparatus in accordance with claim 13 wherein the program information carried in the transport streams is received out of the sequence specified in the request.

21. Apparatus in accordance with claim 13 wherein said processing includes dividing the requested information into multiple lists and searching each list as program information is received from the transport streams.

22. Apparatus in accordance with claim 21 wherein a linear search algorithm is used to conduct the search.

23. Apparatus in accordance with claim 21 wherein a binary search algorithm is used to conduct the search.

24. Apparatus in accordance with claim 13 wherein a plurality of requests is received simultaneously from different applications.

\* \* \* \* \*